United States Patent [19]

Hareng et al.

[11] 4,365,869

[45] Dec. 28, 1982

[54] LARGE-SCREEN VISUALIZATION DEVICE

[75] Inventors: Michel Hareng; Serge Le Berre, both of Paris, France

[73] Assignee: Thomson-CSF, Paris, France

[21] Appl. No.: 120,127

[22] Filed: Feb. 11, 1980

[30] Foreign Application Priority Data

Feb. 13, 1979 [FR] France ................. 79 03637

[51] Int. Cl.³ .................................. G02F 1/13
[52] U.S. Cl. ............................ 350/345; 340/784
[58] Field of Search ............. 350/331, 345, 96.10, 350/96.19; 340/765, 784, 795; 358/56

[56] References Cited

U.S. PATENT DOCUMENTS 3,704,068  11/1972  Waly ........................... 350/345
4,068,121  1/1978   Bringhurst ............... 350/96.19 X
4,257,041  3/1981   Masucci ........................ 340/784
4,263,594  4/1981   Masucci ..................... 340/765 X

*Primary Examiner*—F. L. Evans
*Attorney, Agent, or Firm*—Oblon, Fisher, Spivak, McClelland & Mier

[57] ABSTRACT

A device for visualizing an image on a large screen with a small projection distance, in which the image is formed by pieces on an assembly of liquid crystal cells for then projecting it onto a visualization screen by means of an assembly of lenses associated with the liquid crystal cells; to illuminate the cells a transparent plate is used forming a light-guide and which comprises an assembly of networks associated with the cells to extract the light from the plate and project it onto the cells.

8 Claims, 4 Drawing Figures

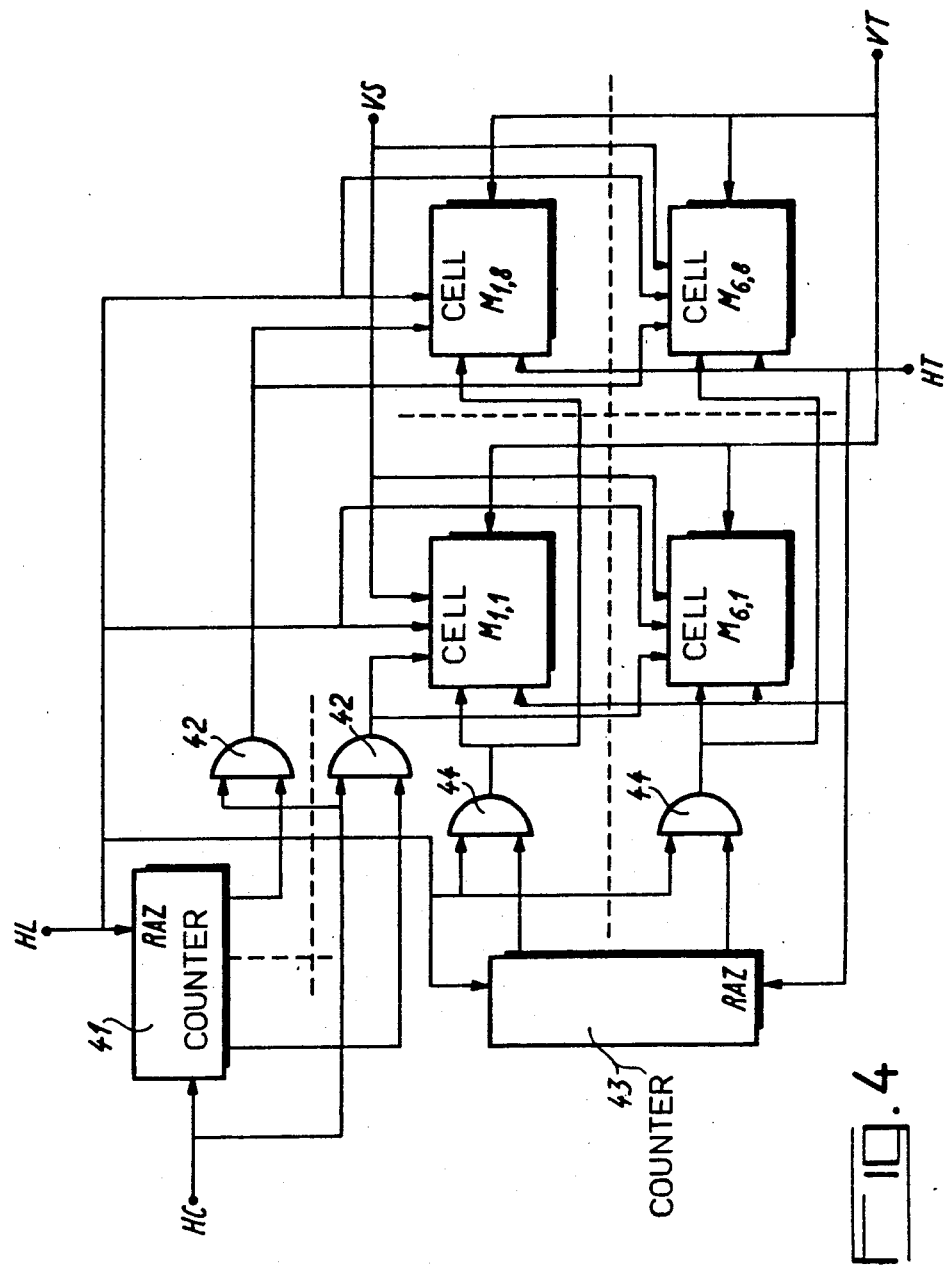

LARGE-SCREEN VISUALIZATION DEVICE

BACKGROUND OF THE INVENTION

The present invention relates to large-screen visualizing devices in which the image which has been displayed on a visualization cell is projected onto a screen. Such a device enables a television image for example to be displayed without using a cathode-ray tube.

It is known to use for this a liquid crystal cell described in the U.S. application Ser. No. 902,112 filed on May 2, 1978, now U.S. Pat. No. 4,202,010, granted on May 6, 1980 in the name of Hareng et al. In this device, the television image is recorded line by line in a smectic liquid crystal layer by using heating lines for bringing the liquid crystal into an isotropic phase. On the return of the liquid crystal to the smectic phase, it is more or less diffusing depending on the electrical voltage representative of the video signal which is applied along the heating line. The dimensions of such a cell are necessarily limited, with a side of the order of 1 cm, and it is necessary in order to obtain an image of the size of that given for example by a cathode-ray tube, to effect an optical projection of this image on a screen. Whatever the optical systems used the bulkiness in depth of the projection device is far from being negligible. On the whole, the overall dimensions of the device comprising the cell, the projection system and the screen are of the order of those of a cathode-ray tube.

These latter years there has been developed, under the generic term of distributed optics, a screen projection device having a small depth. For that, the original image is exploded into a multitude of small pieces which are each projected by a single lens onto a screen. The whole of the system is designed so that on this screen the lines separating the different pieces of the image are substantially invisible. In its original version, this system was purely optical and a description of it can be found in the U.S. review: "Journal of Applied Photographic Engineering", Vol. 3, No. 4, 1977, pages 221–224.

In the issue of Aug. 3, 1978 of the U.S. review "Electronics", it was proposed replacing the small image pieces of this device by liquid crystal cells. Thus is obtained a large-screen visualization device, by optical projection from liquid crystal cells, which has a small depth. However, this description is very sketchy and in particular the system for illuminating the liquid crystal cells is without change in relation to the original optical device and is relatively complicated and costly.

SUMMARY OF THE INVENTION

The object of the invention is a large-screen projection device using a distributed optics technique in which the elementary images are formed in cells in accordance with those described in the above-mentioned patent application. The illumination of these cells is obtained by a transparent plate forming a light guide and peripherally illuminated. A set of areas etched on one of the faces of this plate enables the light which circulates inside to be extracted to illuminate the liquid crystal cells.

The above and other objects, features and advantages of the present invention will become apparent from the following description, given solely by way of non-limiting illustration, when taken in conjection with the accompanying drawings.

DESCRIPTION OF THE DRAWINGS

FIG. 4 shows the diagram of a control device for a visualization device according to the invention.

DESCRIPTION OF THE PREFERRED EMBODIMENTS

Figure 1:
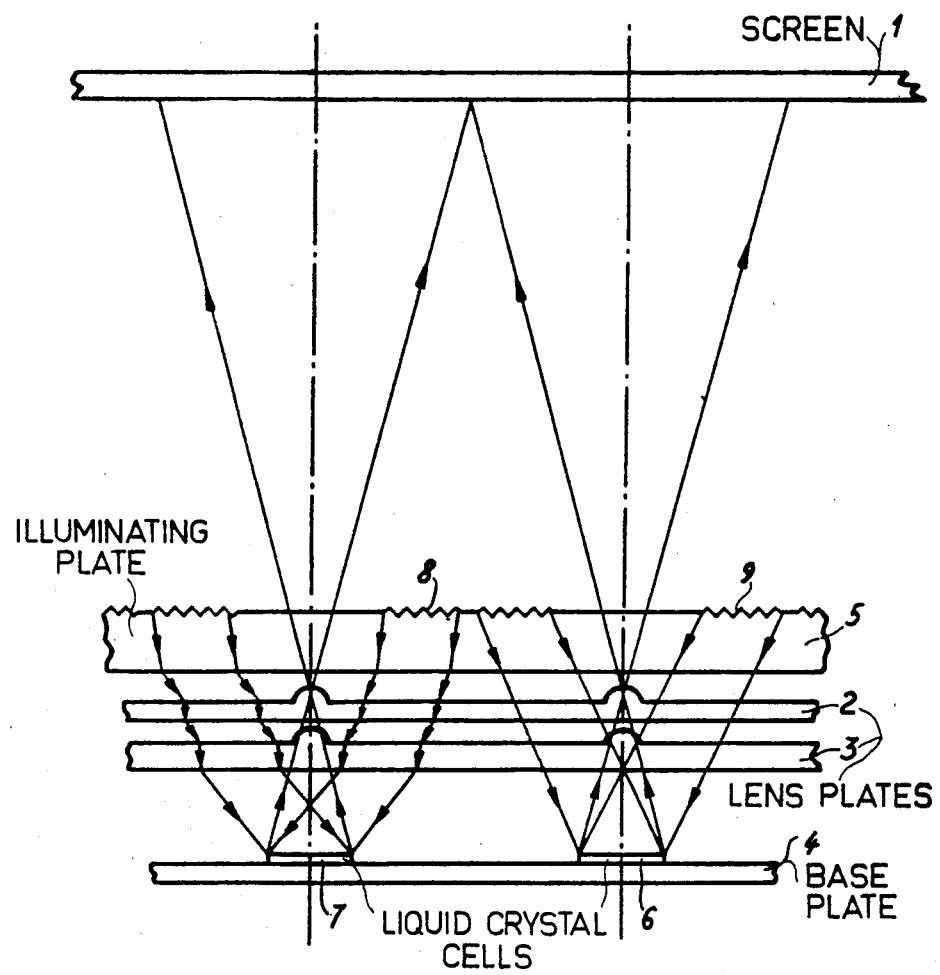
FIG. 1 is a partial view in section of a visualization device according to the invention.

The visualization device shown in FIG. 1 comprises a ground glass 1 forming a screen on which the image is projected through a system of plates 2 and 3 comprising moulded lenses. This image is formed on an array of liquid crystal cells of which only the two cells 6 and 7 are shown in the Figure. These cells are supported by a support plate 4 on which is deposited a network of connections for feeding to the cells the electrical signals defining these images.

These cells operate by reflection and are illuminated from a light-guide plate 5. The light is introduced into this plate 5 in a way which will be described further on. It is propagated therein in a guided manner and cannot escape therefrom through the upper and lower faces. To illuminate the cells there is provided on the upper face of this plate an array of circular networks such as 8 and 9, centered on the axes of the lens-cell systems. The slope and the pitch of these networks are such that when the light rays impinge thereon, they are reflected by the lower face of plate 5 at an angle such that they are no longer subjected to total reflection. They escape therefore from this lower face then pass through plates 2 and 3 outside the lenses to finally illuminate cells 6 and 7. The path of the illuminating rays has been shown in detail on the left of the figure and more schematically on the right.

Cells 6 and 7 operate by reflection, i.e. that when there is no image thereon the light rays pass through the liquid crystal which is transparent and are reflected from the bottom of the cell which is metallic. With the angle of reflection then equal to the angle of incidence, the return light ray passes through plates 3 then 2 outside the lens portions intended to form the image on screen 1. In the portions of the image intended to be visualized on the other hand, the liquid crystal is diffusing and there is then no longer reflection properly speaking but upward diffusion of the light at a relatively large solid angle. A good part of this light thus backscattered is then captured by the lenses carried by plates 3 and 2 and which form thereof the image on screen 1. Contrary to the drawing which is simplified for the sake of clarity, the numerical aperture of the lenses is large and approximately 1, which means that there is little loss of backscattered light.

In a particular embodiment of networks 8 and 9, these are formed by a series of concentric rings triangular in section and centered on the axes of cells 6 and 7. The light rays which are propagated in plate 5 are inclined in relation to the upper and lower faces thereof between a grazing incidence and an incidence corresponding to the angle of total reflection. When they impinge on the faces of the rings forming the network, the incidence of reflection is changed which allows them to exit by the lower face of plate 5. To prevent a loss of light by the network due to the fact that the incidence on the faces of the rings is less than the incidence corresponding to total refraction, the upper surfaces of plate 5 is metalized at the location of these networks. The rays thus extracted from plate 5 by networks 8 and 9 are situated inside a relatively wide cone. So that none of these rays reflected by the metallic bottom of cells 6 and 7 is taken up by the lenses of layers 2 and 3, a collimation effect is used by spacing plate 5 sufficiently from support 4 and by giving to the difference of dimensions between the outer ring and the inner ring of each network, a value substantially equal to the dimensions of cells 6 and 7. The minimum diameter of the inner ring will be chosen so that the endmost ray reflected by the cell is not captured by the projection lenses.

Figure 2:
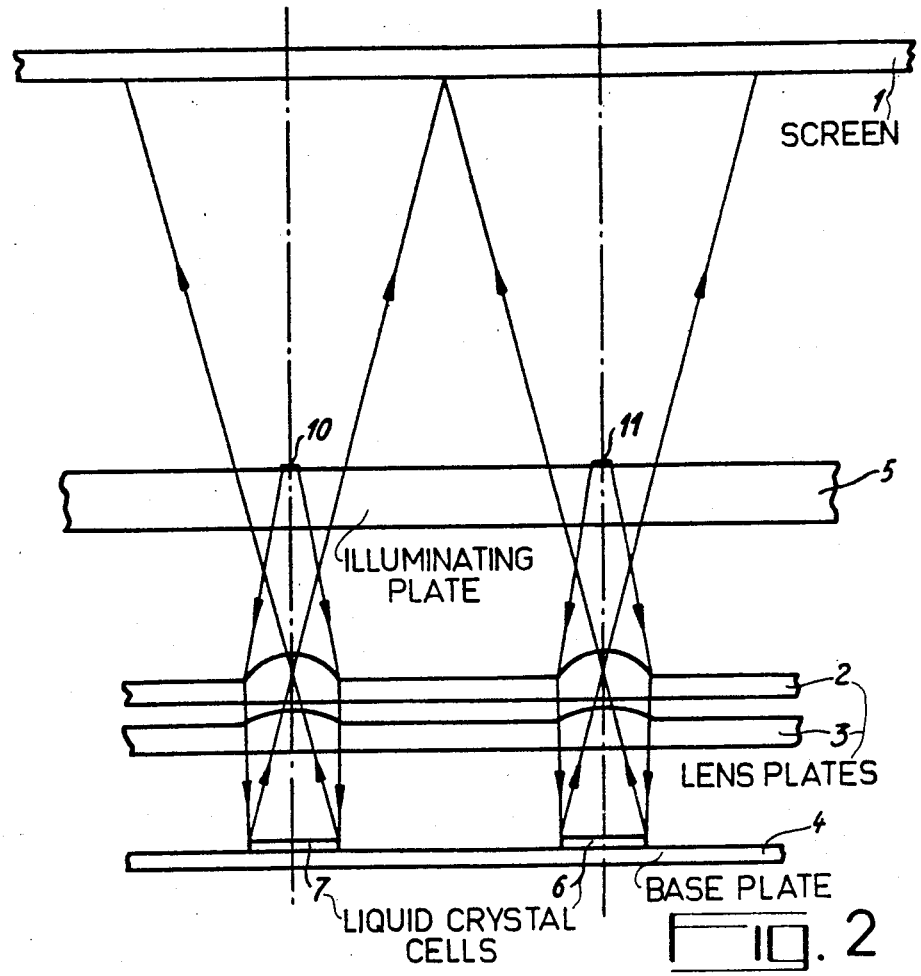
FIG. 2 is a partial view in section of a variation of the device of FIG. 1.

FIG. 2 shows a variation of the embodiment of the device of FIG. 1, in which a plate is used which provides a better efficiency of the illumination of cells 6 and 7.

This plate 5 comprises, at the meeting point with the axes of the cell-lens assemblies on its upper face, small areas 10 and 11 which will be called in what follows illumination points. These illumination points enable the path of the light rays which are propagated in a guided way in plate 5 to be modified. When these rays touch illumination points 10 and 11, they are reflected downwards at a relatively closed solid angle centered on the axes of the lens-cell systems. These light rays thus leave plate 5 and are collected by the lenses carried by plates 2 and 3. By placing the illumination points 10 and 11 substantially at the focal point of the lenses there is obtained exiting from the lenses substantially parallel light beams which enable cells 6 and 7 to be illuminated substantially uniformly and normally.

The light reflected by the metallic bottom of the visualization cells also forms a substantially parallel beam perpendicular to the plane of these cells. This return beam is collected by the lenses and focused by them substantially at points 10 and 11. A metalization deposited on points 10 and 11, which allows moreover the light to be extracted with a better efficiency, stops the return beam and prevents troublesome light spots from forming on screen 1.

The diffusing parts of the liquid crystal on the other hand reflect the light backwards at a relatively large solid angle, and this light collected by the lenses is focused on screen 1 where the image of these diffusing parts is formed. Since screen 1 is close to plate 4 and since the beam forming the images on the screen is already wide on passing through luminous plate 5, the metalized points 10 and 11 only cut off a small part thereof and the light efficiency is good.

One method of forming illumination points 10 and 11 consists in grinding the upper face of plate 5 on small rings centered on the axes of the lens-cell assemblies. These locations thus ground are no longer reflecting but diffusing and the light which they receive leaves again through the lower face of plate 5. To complete the effect and prevent loss of light through the upper face, these locations are metalized. This metalization also serves, as was mentioned above, to stop the return beam coming from the reflection on the metallic bottom of cells 6 and 7.

Figure 3:
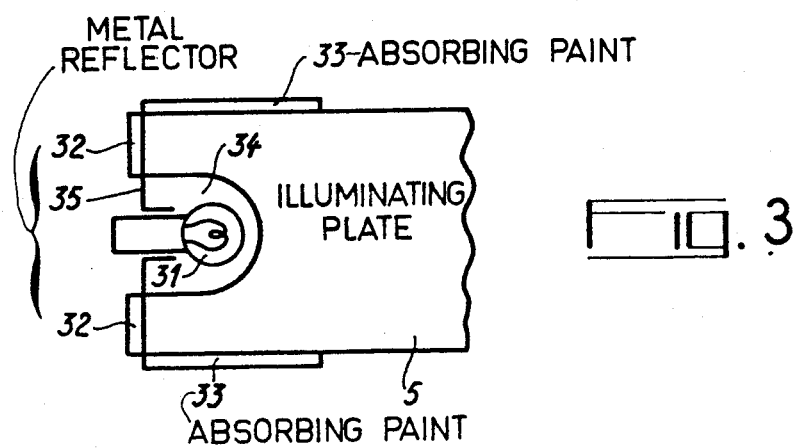
FIG. 3 is a view in section of a means for illuminating plate 5 of the device as shown in FIGS. 1 and 2.

In a particular embodiment shown in FIG. 3, there is used for stimulating illumination of plate 5 a lamp 31 situated in a cavity 34 provided in the lateral wall of plate 5. The other faces of the lateral wall of plate 5 are coated with a metalization 32 which prevents the light, reflected into the plate, from escaping from the plate which behaves like a cavity. The edges of the upper and lower faces are coated with an opaque and absorbent paint 33. The role of this paint is to absorb the light coming directly from the lamp and which would otherwise leave without being subjected to total reflection on these faces. The width of this paint strip is such that a ray coming from the endmost point towards the right of the filament of the lamp cannot touch one of the upper or lower faces outside the zone covered by the paint except by being subjected to total reflection.

Thus the light emitted by the lamp is as it were imprisoned inside the plate and can only exit therefrom for example through the functioning of networks 8 and 9, or through the functioning of illumination points 10 and 11. To obtain a sufficient light strength, an assembly of lamps distributed around the periphery of the plate may be used. A light tube may also be used provided for example with a rectilinear filament and situated in a groove provided along this periphery. It is useful in these two latter embodiments to make the support 35 of lamp 31 itself reflecting, or else to occult the grooves after positioning of the linear lamp by means of a cover itself reflecting.

When a conventional projection device is used with a single liquid crystal cell the control circuits are normally integrated directly on the substrates which form the faces of the cell. In fact, for a television standard visualization device for example, it is necessary to have a matrix which comprises substantially 600 horizontal lines and 800 vertical columns, the whole in a rectangle whose dimensions are of the order of a centimeter. The number and the fineness of the connections make necessary integrations of these connections and of the control circuits which are connected thereto.

In a device in accordance with the invention, on the other hand, 48 elementary liquid crystal cells may be used distributed in 6 lines of 8 cells. These cells will be square and will each comprise 100 lines and 100 columns which indeed corresponds to the total number of 600 lines and 800 columns. To provide 100 connections over a length of 1 cm conventional techniques may be used which do not require use of integrating techniques. Under these conditions, the cells properly speaking will only comprise the columns receiving the video signal and the lines receiving the heating signals. The whole of the control electronics will be provided with a hybrid technology comprising a maximum of standard elements. The support for these components will be plate 4 formed for example by a metal substrate enameled with an insulating coating. The connections between the outputs of the electronic means built in hybrid form on this plate and the inputs of the liquid crystal cells will be made for example by means of wires screen-printed on this insulating layer. Since there is a large free space between the cells, the connections for connecting the heating wires may have a large width and so a small resistance. Thus the heating power will be dissipated essentially in the resistive lines forming part of the cells and not in the connecting wires.

Such a device comprising on the same support on the one hand an assembly of cells without electronic control means and on the other hand an electronic control means adapted to this assembly of cells, is particularly useful when it is desired to construct a large number of copies thereof.

For small-scale manufacture it is useful to have a modular system. For that, square liquid crystal cells will for example be used with 100 lines by 100 columns and comprising their own integrated electronic control means. These cells will then be associated depending on the dimensions of the desired visualization device and they will be connected to a simplified external electronic control means.

It is recalled that the cells used and described in patent application Ser. No. 902,112 operate from line and frame synchronizing signals respectively HT and HL, of a dot clock HC defining the number of dots per line, i.e. the number of columns, of a video signal VS and a heating voltage VT.

In the embodiment shown in FIG. 4, 48 cells are used distributed in 6 lines and 8 columns. The figure is limited to the representation of 4 of these cells, i.e. $M_{1,1}$; $M_{1,8}$; $M_{6,1}$ and $M_{6,8}$, as well as portions of the external electronic control means which is associated therewith. These cells comprise their internal electronic means which operates from the signals defined and recalled above. Signal HC arrives at a counter 41 provided with a decoder. This counter turns in time with the pulses of signal HC and successively opens through its decoder each of the 8 gates 42 of an assembly of gates for 100 pulses of HC. These gates receive the signal HC and each of them is connected to the cells of a column, i.e. that the first is connected to cells $M_{1,1}$ to $M_{6,1}$, and the last is connected to cells $M_{1,8}$ to $M_{6,8}$. Thus the first 100 pulses of HC are applied to the cells of the first column, the following 100 pulses to the cells of the second column and the last 100 pulses to the cells of the last column. This counter 41 is itself maintained in phase by the signal HL which is applied to its reset input RAZ. The signal HL which acts at the end of each line is applied simultaneously to the assembly of the cells. The signal VS which is sampled by the HC pulses is also applied simultaneously to all the cells.

Signal HL is also applied to a counter 43 provided with a decoder, which successively opens through its decoder each of the gates 44 of an assembly of gates for 100 pulses of HL. These gates receive in parallel the signal HL and their outputs are connected respectively to the cells of each cell line. Thus the cells $M_{1,1}$ to $M_{1,8}$ receive the first 100 line synchronizing pulses. Cells $M_{2,1}$ to $M_{2,8}$ receive the following 100 pulses and cells $M_{6,1}$ to $M_{6,8}$ receive the last 100 pulses. Counter 43 is maintained in phase by the frame pulses HT applied to its reset input RAZ. These frame pulses which act at the end of the frame are also applied to the assembly of the cells. The assembly of the cells receives finally the heating voltage VT.

The lenses forming the distributed optics are relatively simple lenses which comprise a large number of aberrations in particular pin-cushion and barrel aberrations. To obviate these aberrations, the image which will then be projected is formed from an initial object placed in place of the screen. The image to be projected thus obtained presents reverse aberrations to those given during projection and which are then counterbalanced by these latter. To use a distributed optics device with liquid crystal cells, an anamorphosis of the lines and the columns of the cells is carried out so that the distortion on projection on the screen offset this anamorphosis so that the straight lines remain straight. With direct vision, these cells will then present a pin-cushion or barrel distortion depending on the optical means used for the projection.

The invention extends to all visualization devices using distributed optics and visualization cells operating by reflection whatever the mode of writing in these cells. Other than liquid crystals, they may use materials able to be written on by electrophoresis, electrolysis or electrochromism.

It is apparent that within the scope of the invention, modifications and different arrangements can be made other than is here disclosed. The present disclosure is merely illustrative with the invention comprehending all variations thereof.

What is claimed is:

1. A device for visualizing an image on a large screen, which comprises:
    a plurality of liquid crystal visualization cells spread out in a plane so as to visualize each one a piece of said image;
    a transparent plate forming a light-guide substantially parallel to the plane of said cells;
    means for injecting into said transparent plate light radiation which is propagated therein in a guided manner;
    light path modifying means arranged in one face of said transparent plate for extracting from said transparent plate said light radiation and for selectively illuminating said cells, said cells having a metallic bottom and operating by reflection;
    a screen for visualizing by transparency substantially parallel to the plane of said cells and situated at a small distance therefrom;
    a plurality of lenses for projecting separately onto said screen the pieces of image written into said cells to reform on this screen the complete image, said lenses being arranged for collecting back scattered light radiation emerging from said cells, said back scattered radiation being selectively transmitted to said screen.

2. The device as claimed in claim 1, wherein said means for extracting said light radiation comprise a plurality of circular networks etched on the face of said transparent plate turned towards said screen above each said cell; each network enabling the light radiation being propagated in said plate to be sent towards the other face of this plate at an angle which allows it to exit from the plate in order to illuminate the cell associated with the network.

3. The device as claimed in claim 2, wherein each said network is formed from concentric circular grooves triangular in section forming a ring, and the surface of the network is covered with a reflecting layer.

4. The device as claimed in claim 3, wherein said transparent plate is situated between said screen and said lenses; the width of said ring being substantially equal to the largest dimension of said cells and the inner diameter of said ring being greater than the value allowing at least one ray being subjected to a metal reflection on the cell corresponding to said ring to be captured by the lens corresponding to said ring.

5. The device as claimed in claim 1, wherein said transparent plate is placed between the screen and the lenses, and said means for extracting the light radiation comprise a plurality of ground disks on the face of said transparent plate turned towards said screen and situated substantially at the focal point of said lenses; these disks being covered with a reflecting layer.

6. The device as claimed in claim 1, wherein said means for injecting said light radiation comprise at least one light source inserted in a cavity hollowed out in one of the lateral walls of said transparent plate, these lateral walls being coated with a reflecting layer.

7. The device as claimed in claim 6, wherein said light source is a rectilinear filament lamp and said cavity is elongated and extends substantially along the whole of one of said lateral walls.

8. The device as claimed in claim 6, wherein the upper and lower faces of said transparent plate are covered along their edges with an opaque layer for cutting off the rays coming from said light source and impinging on these two said faces without being subjected to total reflection.

* * * * *